UNITED STATES PATENT OFFICE.

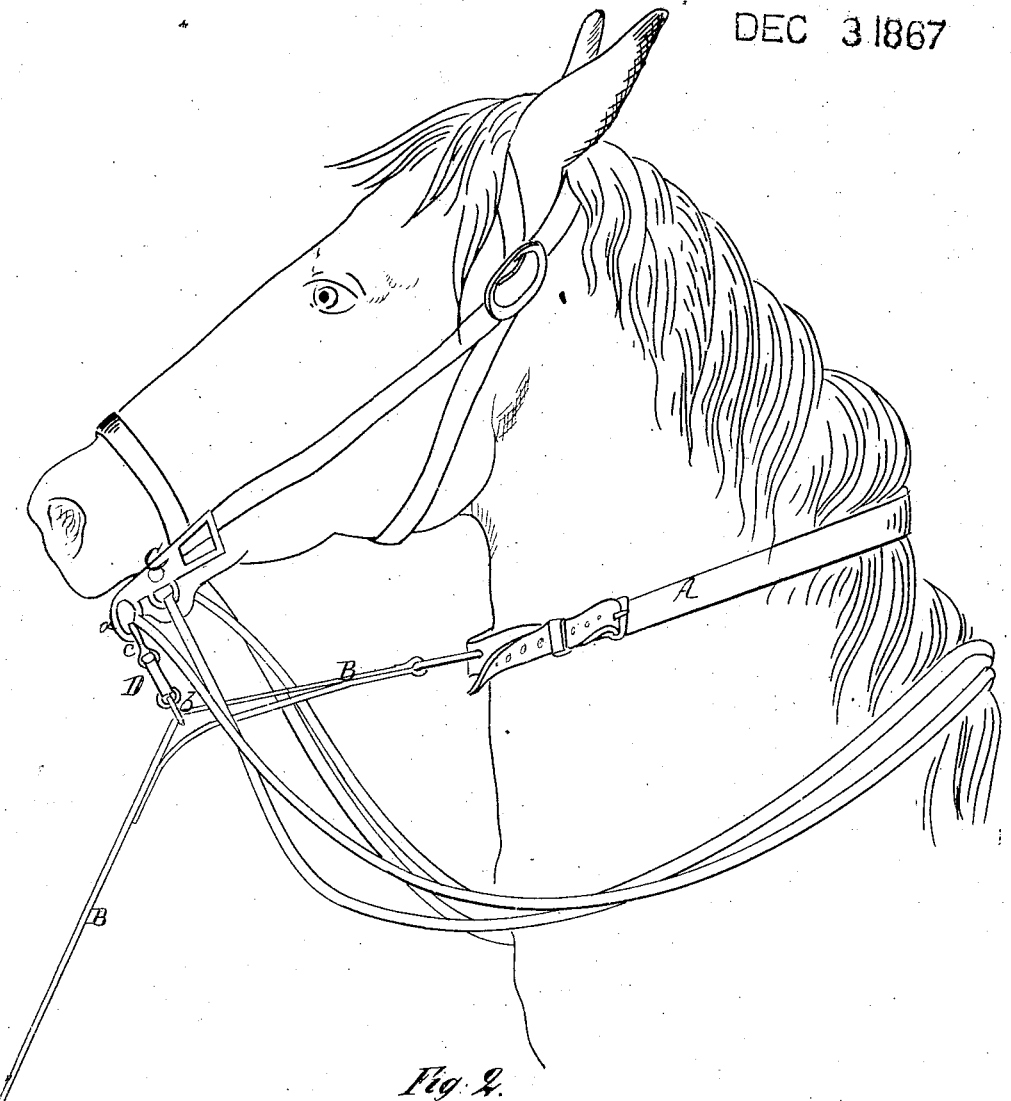

THOMAS P. CHAMBERS, OF NEWTOWN, PENNSYLVANIA.

IMPROVED HITCHING-STRAP.

Specification forming part of Letters Patent No. 71,699, dated December 3, 1867.

*To all whom it may concern:*

Be it known that I, THOMAS P. CHAMBERS, of Newtown, in the county of Bucks and State of Pennsylvania, have invented a new and useful Improvement in Hitching-Strap; and I do hereby declare that the following is a full, clear, and exact description thereof, which will enable those skilled in the art to make and use the same, reference being had to the accompanying drawings, forming part of this specification, in which—

Figure 1 represents a side view of my invention. Fig. 2 is a front view of the same.

Similar letters of reference indicate corresponding parts.

This invention relates to a new manner of arranging the strap for hitching horses to posts or other stationary devices; and consists in the use of a chain or strap secured with its ends to the rings of the bridle-bit.

The hitching-strap, which is fastened to the halter, is passed through this chain or strap, and is tied to the post. When the horse tries to tear the hitching-strap, the aforesaid chain will be pulled, acting as a curb to draw the mouth-piece back, and the horse will consequently be prevented from tearing the hitching-strap and from running away.

A represents the halter, laid around the horse's neck, or otherwise applied in the usual manner. B is the hitching-strap, secured with one end to the halter, as usual. C represents the bridle-bit, and *a a* are the rings formed on the ends of the same. D is a short chain or strap, having, if desired, a ring, *b*, in its middle, and snap-hooks *c c* at its ends, as shown in Fig. 2. By means of the snap-hooks the ends of the chain or strap D can be easily fastened to the rings *a*, as indicated in Fig. 2. The hitching-strap is drawn through the ring *b*, or simply through the opening formed between the strap D and the horse's head. When, then, the outer end of the strap B is fastened to a post or other stationary device, the self-checking hitching device will be completed.

When the horse pulls the strap B, the chain D will be drawn back, acting as a curb to check the horse, and to prevent it from tearing the hitching-strap, and from running away.

I claim as new and desire to secure by Letters Patent—

A self-checking hitching device, consisting of the chain or strap D, fastened by means of snap-hooks or otherwise to the ends of the bridle-bit, and combined with the hitching-strap, substantially in the manner and for the purpose herein shown and described.

THOMAS P. CHAMBERS.

Witnesses:
ALFRED M. PARSONS,
SAML. COMFORT.